United States Patent Office 3,024,967
Patented Mar. 13, 1962

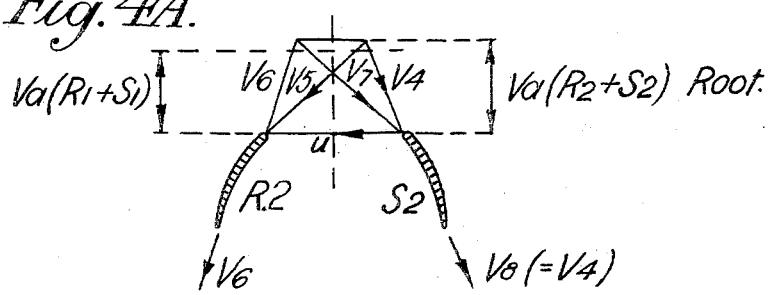
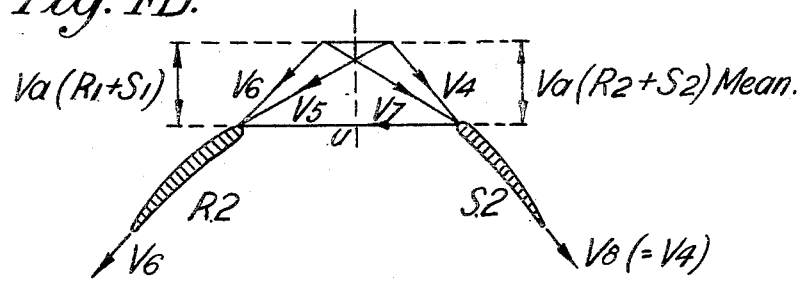
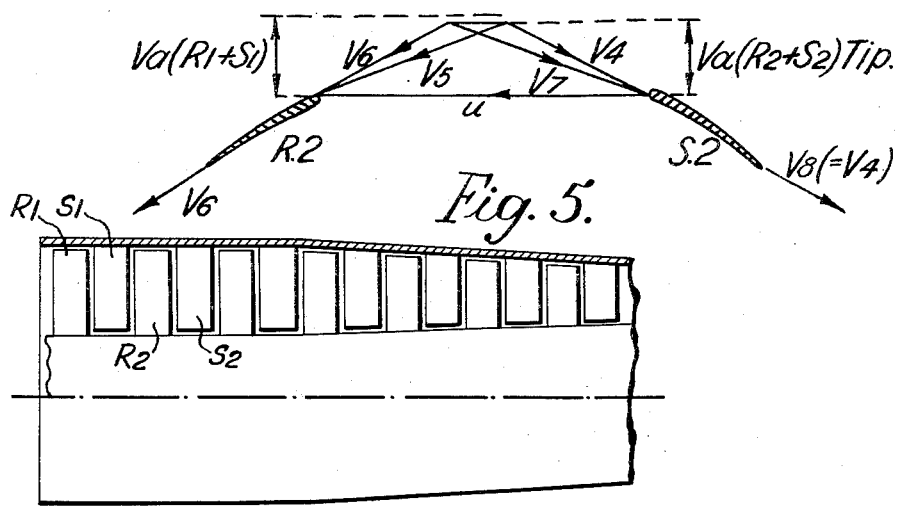

3,024,967
MULTI-STAGE AXIAL-FLOW COMPRESSORS
Geoffrey Light Wilde, Shottlegate, and Walter Thomas Howell, Chellaston, England, assignors to Rolls-Royce Limited, Derby, England, a British company
Filed Feb. 19, 1957, Ser. No. 641,227
Claims priority, application Great Britain Feb. 21, 1956
2 Claims. (Cl. 230—122)

This invention comprises improvements in or relating to multi-stage axial-flow compressors for gaseous media.

It is an objective in the design of multi-stage axial-flow compressors, more particularly those used in aircraft gas-turbine propulsion engines, to obtain the maximum airflow per unit frontal area, and it has been found that in conventional designs involving inlet guide vanes directing the flow of air to the first, or inlet row of rotor blades of the compressor, increased axial velocity results in considerable pressure losses in the row of stationary inlet guide vanes. These pressure losses can be substantial when the inlet axial velocity is high, e.g., in excess of 600 ft. per sec.

It is the primary object of the present invention to provide a high-performance multi-stage axial-flow compressor in which inlet guide vanes are eliminated, thereby eliminating the pressure losses associated with them.

According to the present invention a high-performance multi-stage axial-flow compressor has no inlet guide vanes immediately preceding its first stage rotor blades, and has its first-stage rotor blades designed for free vortex and arranged to receive its inlet flow in a substantially axial direction, the relative velocity of the gaseous medium and the blades being supersonic over a part at least of the length of the blades under design operating conditions, said rotor blades being followed by a row of stator blades which modifies the free vortex flow to give constant reaction flow with radial equilibrium into the second stage rotor blades.

It has been found that the higher Mach numbers relative to the first-stage rotor blades resulting from the omission of inlet guide vanes causes a small loss of stage efficiency, but this loss is more than compensated for by the increase in efficiency resulting from the complete elimination of pressure losses in the inlet guide vanes.

A design of multi-stage axial-flow compressor in accordance with the present invention may result in the row of stator blades which follows the row of first-stage rotor blades, having blades in which the root portions present a normal camber, a mean section presents substantially zero camber and the tip section presents reversed camber. The final design of the stator blading will, however, depend upon a number of design factors including the distribution of the axial velocity at the entry of the compressor and the work done in subsequent stages, and thus in certain cases the degree of reverse camber at the tip may be reduced to the extent that substantially zero camber is presented, whilst the camber in the normal sense at the mean section may be of reduced extent.

By a "high-performance" compressor is meant one in which the temperature rise per stage is not less than 15° centigrade, and in which the mass flow is not less than 20 lb./sec./sq. ft. of frontal area, the frontal area being taken as a circle having the diameter of the tip of the first row of blades. The term "multi-stage" means having at least three stages, a stage being, as is well-known, a row of rotor blades followed by a row of stator blades. The term "free vortex" as applied to the first-stage rotor blades means that the whirl velocity of the gas at exit from the rotor blade is inversely proportional to the radius at each particular location on the blading.

With reference to the second-stage rotor blades mentioned above, the term "constant reaction" means that the ratio of the pressure rise in the row of rotor blades to the sum of the pressure rises in this row of rotor blades and the following row of stator blades is constant at all radii. Further, the term "radial equilibrium" as applying to the second-stage rotor blades means that radial movements of the streamlines are substantially complete before entry to the rotor and that in the plane of the leading edge of the second-stage rotor blades the radial velocity components at all points lengthwise along the blade are substantially zero. In other words the difference in pressures between any two such points, divided by the densities at those points, is proportional to the square of the whirl velocity of the gas divided by the radius.

The nature of the invention may be more readily understood by reference to the accompanying diagrammatic drawings in which.

Figure 3A:
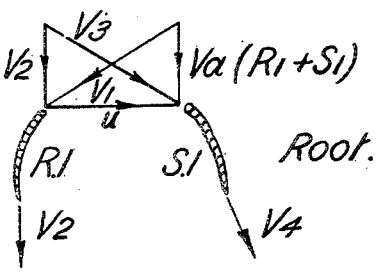
Figure 3B:
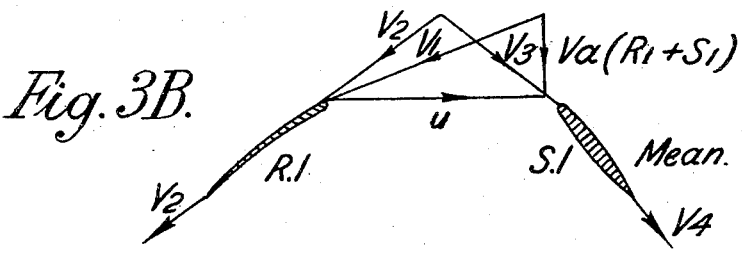
Figure 3C:
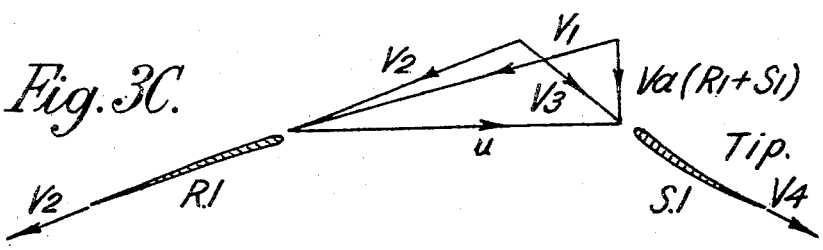

FIGURES 3A, 3B, 3C illustrate diagrammatically in vector form first-stage axial-flow compressor blading in accordance with the present invention, FIGURES 4A, 4B, 4C illustrate diagrammatically in vector form second stage axial-flow compressor blading in accordance with the present invention, and FIGURE 5 is a diagrammatic view of a multi-stage axial-flow compressor in accordance with the present invention.

Figure 1:
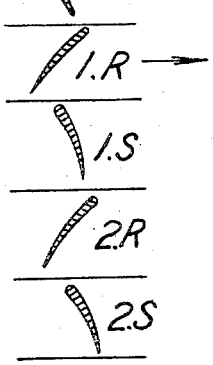
FIGURE 1 shows conventional axial-flow compressor blading.

Referring to FIGURE 1, the inlet end of a conventional arrangement of high-performance multi-stage axial-flow compressor comprises inlet guide vane blading referenced I.G.V., first-stage rotor blading 1.R, first-stage stator blading 1.S, second-stage rotor blading 2.R and second-stage stator blading 2.S. Such blading throughout may be such as to provide constant reaction.

Figure 2:
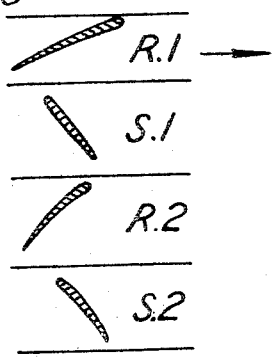
FIGURE 2 shows axial-flow compressor blading according to the present invention in which inlet guide vane blading is omitted.

In the arrangement in accordance with the present invention, shown in FIGURE 2, no inlet guide vane blading is provided and the air or other gas to be compressed enters directly into first-stage rotor blading shown at R.1; the first-stage rotor blading is shown at S.1 with succeeding second-stage rotor and stator blading R.2 and S.2. The second-stage rotor blading 2.R (FIGURE 1) and R.2 (FIGURE 2) and subsequent stator and rotor blading in each compressor system may be of similar constant reaction design, the present invention being more particularly directed to the design of the rotor blading R.1 and subsequent stator blading S.1.

In accordance with the invention, the first-stage rotor blading R.1 is of free vortex design, i.e. so that the whirl velocity on exit from the blading is inversely proportional to the radius. Thus, referring to FIGURE 3A, 3B and 3C, the substantially axial velocity of air entering the row of rotor blades R.1 is indicated on the vector diagrams at V$a$; the rotational velocity of the blading is indicated at U, giving a resultant relative entry velocity V1 to the rotor blades. FIGURE 3A illustrates the conditions at the root of the blading, FIGURE 3B illustrates those at a mean position between the root and tip, and FIGURE 3C illustrates the conditions at the tip. Thus the first stage rotor blading may be such that V1 at the root is of the order of Mach 0.8, that at the mean section Mach 1.0 and at the tip Mach 1.2. Such velocities may result in a slight loss in efficiency of this stage of the compressor, but such loss is more than compensated by the gain obtained by omitting the inlet guide vanes, particularly where high inlet axial velocities, for example, of the order of 600 ft. per second, are catered for in the design.

The outlet velocity relative to the rotor blades R.1 is shown by vector V2, and the consequent inlet velocity to the stator blades S.1 is shown by the vector V3. The section of the stator blades S.1 at the root has the normal camber experienced in such blades, that is, it tends to turn the working fluid toward the axial direction. V4 indicates the direction of flow of working fluid from the first stage stator blading S.1. At the mean position the blade section has zero camber, and thus does not alter the direction of the working fluid flow; and at the tip section the blade has a reverse camber, and increases the whirl velocity.

Referring now to FIGURES 4A, 4B and 4C, these figures illustrate in vector form the conditions at root, mean, and tip positions along the second stage blading R.2 and S.2. V4 is the outlet velocity from the first-stage stator blading, V5 is the inlet velocity to the second-stage rotor blading R.2. V6 is the outlet velocity of the rotor blading R.2, V7 is the inlet velocity to the second-stage stator blading S.2, and V8 is the outlet velocity of the stator blading S.2. It will be seen that at the mean positions along the blading, the axial velocity Va of the working fluid in the first stage blading (R1+S1) is equal to the axial velocity Va (R2+S2) in the second stage, whereas the axial velocity at the root section is less in the first stage blading (R1+S1) than in the second stage blading (R2+S2), and at the tip section is higher in the first stage blading than in the second stage blading. Further the design is such that the outlet velocities V4 from the first stage blading is equal in magnitude and direction to the outlet velocity V8 of the second stage blading.

We claim:

1. A high performance multi-stage axial-flow compressor designed for use in compressing gas having a high inlet axial velocity, said compressor comprising a plurality of stages of blading, each blading stage comprising a row of radially extending rotor blades and a row of stator blades downstream of the row of rotor blades, the first row of blades at inlet to the compressor being the rotor blades of the first stage of the compressor, said first row of blades being designed at each point in the length of its leading edge to receive gas having a substantial axial direction of flow, being further designed, shaped and arranged for free vortex flow that is to give a whirl velocity of gas at exit from the blades at each point in the length of the blade inversely proportional to the radial distannce of the point from the axis of rotation and being further designed, shaped and arranged to give a supersonic velocity of the gas relative to the blade over a part at least of the length thereof under design operating conditions, and the second stage rotor and stator blades being designed, shaped and arranged so that the ratio of the pressure rise in the second row of rotor blades to the sum of the pressure rises in the second row of rotor blades and the second stage stator blades is constant at all radii, and the first stage station blades being designed, shaped and arranged so that at entry of the gas to the rotor blades of the second stage the radial velocity of the gas at all points along the blades is substantially zero.

2. A high-performance multi-stage axial-flow compressor according to claim 1, wherein the blades in the row of stator blades immediately following the first-stage rotor blades have root portions presenting a normal camber, a mean section presenting substantially zero camber and tip sections presenting reversed camber.

References Cited in the file of this patent

UNITED STATES PATENTS

| 2,378,372 | Whittle | June 12, 1945 |
| 2,415,847 | Redding | Feb. 18, 1947 |
| 2,749,026 | Hasbrouck et al. | June 5, 1956 |
| 2,839,239 | Stalker | June 17, 1958 |

OTHER REFERENCES

Axial Flow Compressors, Horlack, 1958, Butterworths Scientific Publications, London. Pages 164–165.